United States Patent [19]

Boggs

[11] 4,114,958
[45] Sep. 19, 1978

[54] REPLACEABLE WEAR MEMBERS FOR AN ENDLESS TRACK

[75] Inventor: Roger L. Boggs, East Peoria, Ill.

[73] Assignee: Caterpillar Tractor Co., Peoria, Ill.

[21] Appl. No.: 781,821

[22] Filed: Mar. 28, 1977

[51] Int. Cl.² ............................................ G62D 55/20
[52] U.S. Cl. .......................................... 305/56; 305/57
[58] Field of Search ......................... 305/57, 56, 35 R; 74/245 R, 245 C, 245 LP, 247

[56] References Cited

U.S. PATENT DOCUMENTS

| 1,186,785 | 6/1916 | Holt .................................... 305/57 X |
| 2,012,958 | 9/1935 | Colby et al. ...................... 305/57 UX |
| 2,733,965 | 2/1956 | Gladden ............................ 305/57 X |

Primary Examiner—Robert B. Reeves
Assistant Examiner—John P. Shannon
Attorney, Agent, or Firm—James R. Bell

[57] ABSTRACT

A track shoe wear assembly for endless track-type vehicles includes at least one support member being of a construction sufficient for releasable connection to a track shoe and a separate drive member releasably connected to the support member.

9 Claims, 7 Drawing Figures

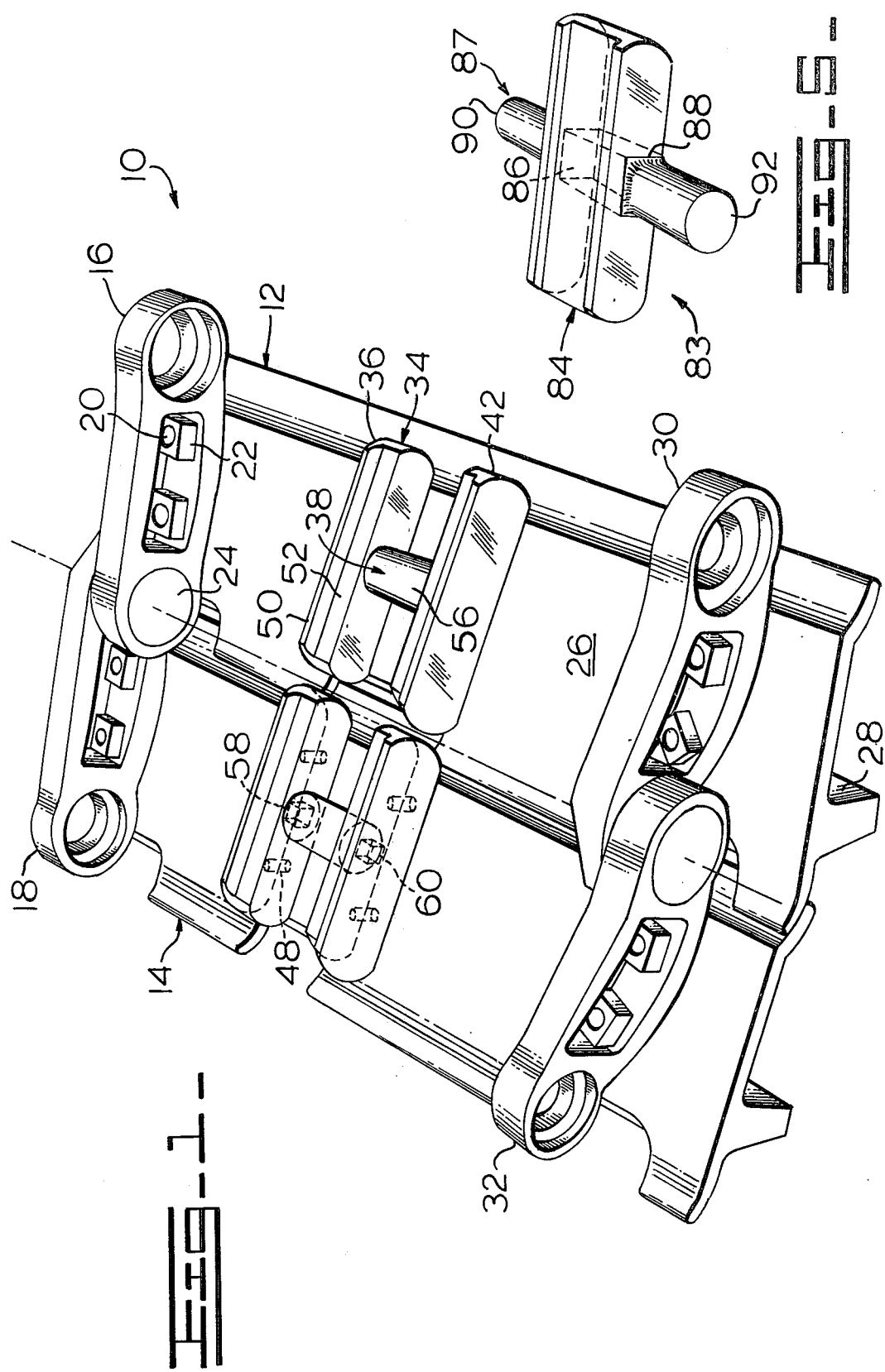

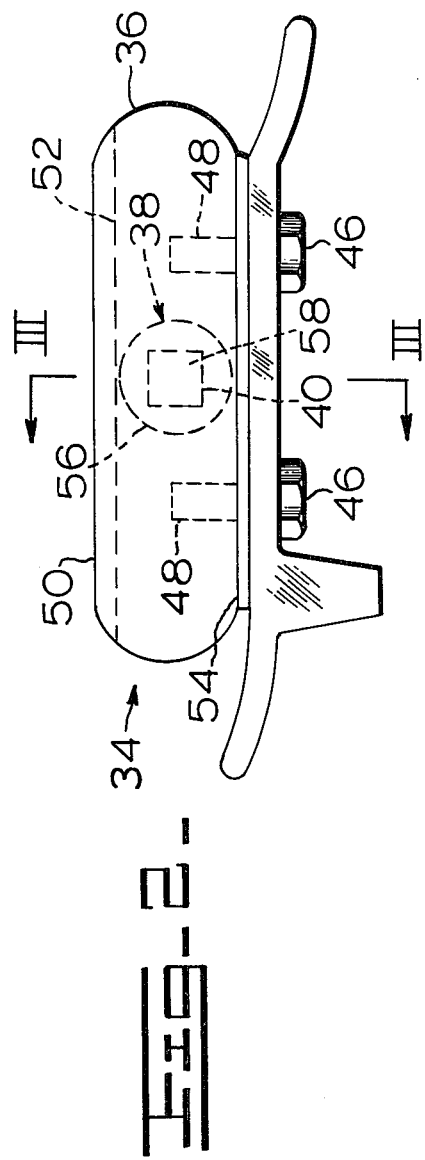
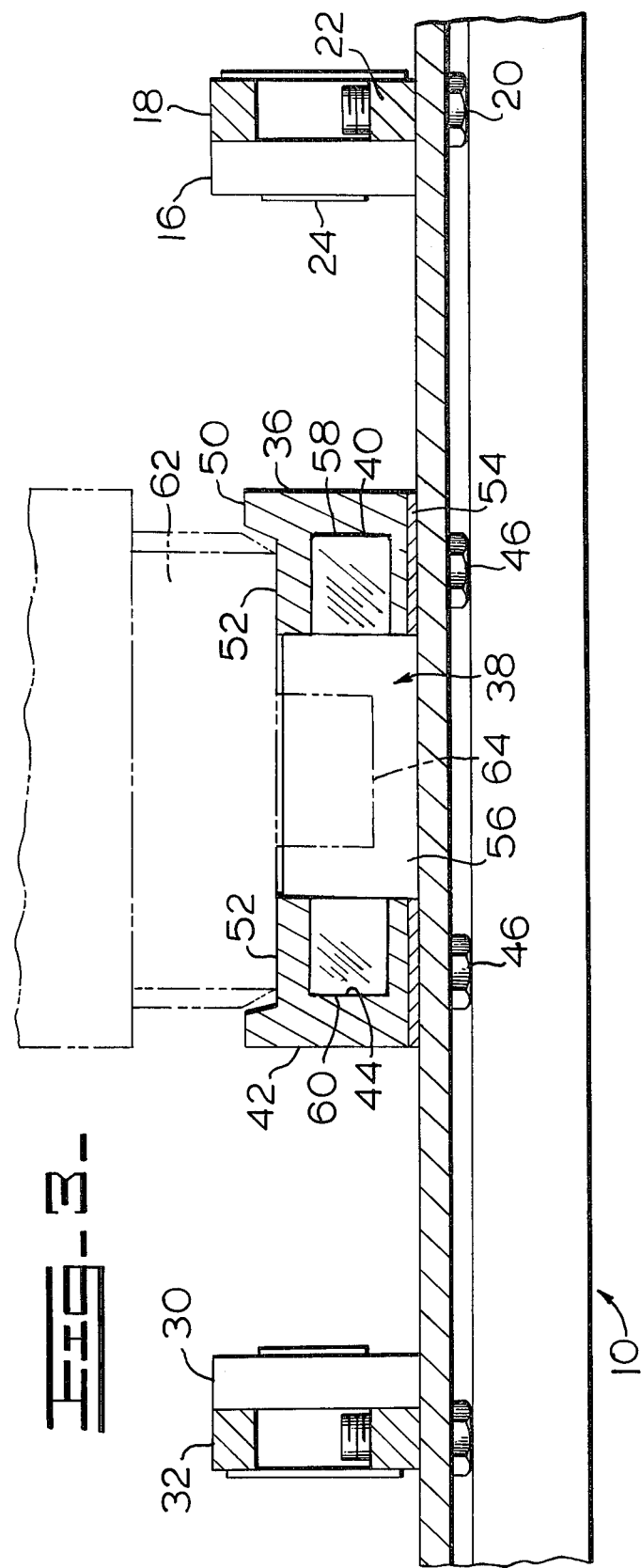

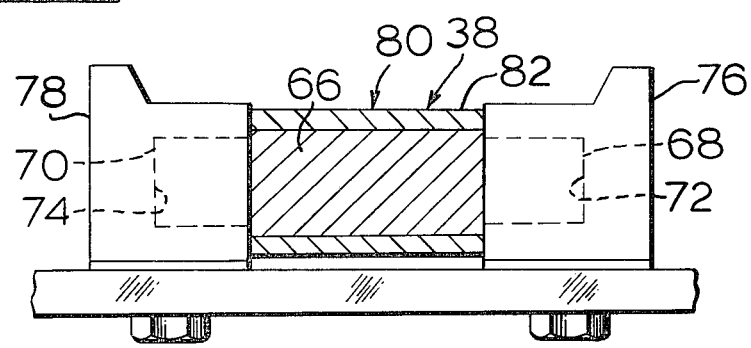
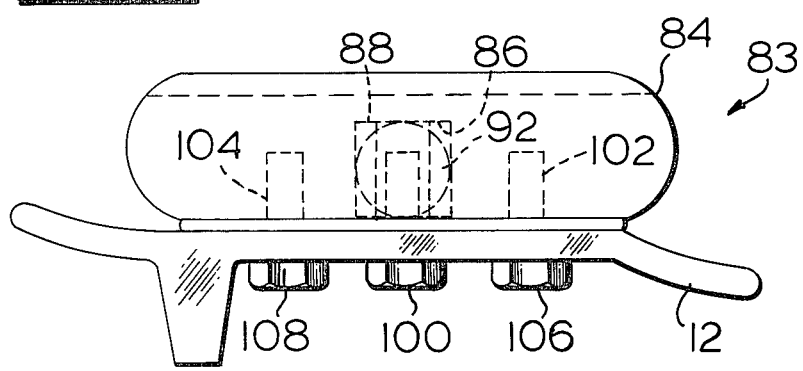
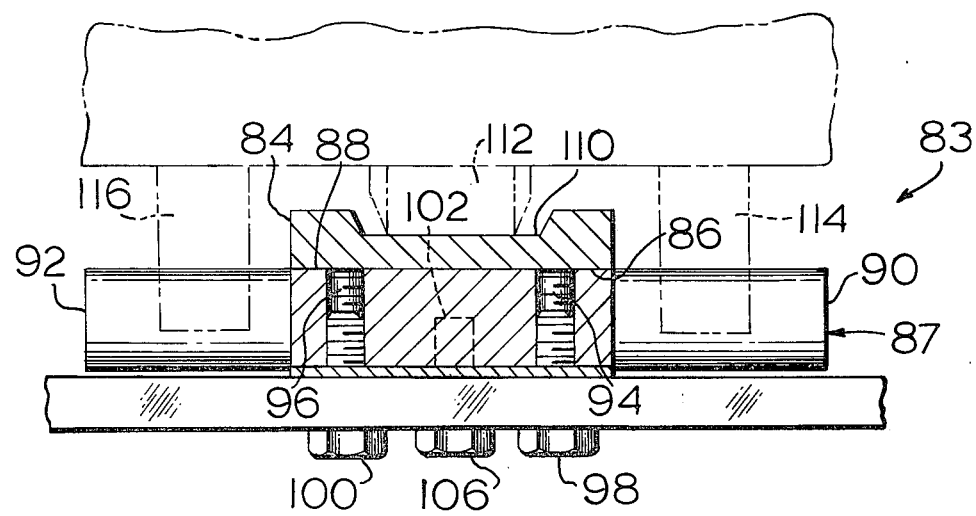

REPLACEABLE WEAR MEMBERS FOR AN ENDLESS TRACK

BACKGROUND OF THE INVENTION

1. Field of the Invention:

This invention relates generally to wheel substitutes for land vehicles and more particularly to sprocket and track engagement for tracks or treads.

2. Description of the Prior Art:

Endless tracks of track-type vehicles include wear members having rail support surfaces for running supportive and guiding engagement with the track rollers and idlers of the vehicle undercarriage. Also drive lugs have been provided on the shoes for driving engagement with the drive sprocket portion of the undercarriage. As a result, these rail support surfaces and lug drive members experience substantial wear and generally require replacement prior to other, less wear-prone, components of the track. In the past, easily replaceable integral wear members have been provided including both the rail surface portions and the lug drive portions. Thus, when either of these portions becomes worn excessively the entire integral wear member must be replaced. Unfortunately, this sometimes involves discarding a wear member whose lug portion is excessively worn but whose rail surfaces are satisfactory. This results in unnecessary waste and expense. It would be of substantial benefit to have easily replaceable separate wear portions such as the rail surfaces and the drive lugs.

SUMMARY OF THE INVENTION

The present invention is directed to overcoming one or more of the problems as set forth above.

According to the present invention, this is accomplished by providing a segment of a track shoe including at least one rail support member being of a construction sufficient for releasable connection to a track shoe and a separate lug drive member releasably connected to the support member.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view of a portion of an endless track illustrating an embodiment of the wear assembly of this invention mounted between links on a track shoe;

FIG. 2 is a side elevational view illustrating the embodiment of the wear assembly of FIG. 1;

FIG. 3 is a frontal view in partial cross-section illustrating the embodiment of the wear assembly of FIG. 1 as viewed along the line 3—3 of FIG. 2;

FIG. 4 is a frontal view in partial cross-section illustrating another embodiment of the wear assembly of this invention;

FIG. 5 is an isometric view illustrating a further embodiment of the wear assembly of this invention;

FIG. 6 is a side elevational view further illustrating the embodiment of FIG. 5; and FIG. 7 is a frontal view in partial cross-section still further illustrating the embodiment of FIGS. 5 and 6.

BRIEF DESCRIPTION OF THE PREFERRED EMBODIMENT

Referring now to the drawings, FIG. 1 illustrates a portion of an endless track generally designated 10 and including a shoe 12 linked to a similar shoe 14 using corresponding hinge link members 16,18, respectively, releasably secured to their respective shoes by bolts 20 and nuts 22. A pin 24 connects links 16,18 together in the well known hinge-like arrangement to ultimately form an endless track. The shoes 12,14 are transversely disposed and include an inner surface 26 and an outer ground engaging surface 28. Link 16 is spaced apart from corresponding link 30 on shoe 12 for articulate coupling with corresponding links 18 and 32, respectively, of shoe 14. This couples shoes 12,14 together in side-by-side relationship in a well known manner.

Generally, shoe 12 includes a wear assembly 34 having at least one rail support member 36 being of a construction sufficient for releasable connection to track shoe 12 and a separate lug drive member 38 releasably connected to the rail support member.

Preferably, wear assembly 34, FIGS. 2 and 3, includes first rail support member 36 having a first rectangular keyway 40 formed therein. A second rail support member 42 is in substantially parallel spaced relationship with respect to member 36 and has a second keyway 44 formed therein. Members 36,42 are secured to shoe 12 by bolts 46 or the like which pass through shoe 12 and into threaded receptacles 48 formed therein. In this manner, rail members 36,42 are releasably connected to shoe 12 in parallel spaced relationship and keyways 40,44 are in coaxial alignment. Rail members 36,42 typically include guide rails 50 and rail wear surfaces 52. Also a shim 54 may be provided to compensate for wear as is known.

Lug drive member 38 is a unitary member and generally includes elongated cylindrical main body portion 56 having a reduced rectangular first key 58 on a first end thereof engaged with first keyway 40 and also has a similar second key 60 formed on the opposite second end and engaged with a second keyway 44. Thus, lug 38 is of symmetrical construction sufficient for releasable connection with first and second keyways 40,44 of rail members 36,42, respectively, to permit the lug to be releasably connected with the rails in a plurality of rotatable positions. That is, lug 38 can be flipped over with respect to the rails to expose a new wear surface. If the keys 58,60 are of symmetrical cross-section, for example, the lug 38 could be rotated through 180° increments to each of two positions.

Wear member assembly 34 thus provides rail surfaces 52 for supportive engagement with a plurality of undercarriage track rollers such as that graphically illustrated in phantom outline at 62 and lug member 38 for driving engagement with a plurality of undercarriage sprocket teeth such as that graphically illustrated in phantom outline at 64. Preferably the wear assembly of this invention is constructed of a forged suitable steel material.

Alternatively, FIG. 4 illustrates that lug 38 can include reduced diameter cylindrical main body portion 66 having first and second keys 68,70 at opposed ends thereof for releasable connection in first and second keyways 72,74 of first and second rail members 76,78, respectively. In addition, annular sleeve 80 can be rotatably mounted on main portion 66 of lug 38 between first and second rail support members 76,78. In this manner there is provided a rotating surface for contact with sprocket 164 (not shown) so as to distribute wear around the outer surface 82 of sleeve 80.

Another alternative embodiment is illustrated at FIGS. 5, 6 and 7 and includes alternative wear member assembly 83 having a single rail support member 84 including a rectangular keyway 86 formed therethrough. Lug 87 is substantially elongated including keyed rectangular cross-section main body portion 88 and circular cross-section first and second ends 90, 92 extending therefrom. In this manner, rectangular main body portion 88 can be releasably connected within rail 84 so that end portions 90, 92 extend equidistant therefrom. Threaded holes 94, 96 formed through main portion 88 permit lug 87 to be releasably connected to shoe 12 from opposite sides by bolts 98, 100 and thus rotated or flipped oer 180° to expose a new wear surface. Also, symmetrical construction of lug 87 and associated keyed main portion 88 permits releasable connection with rail 84 a plurality of rotatable positions such as previously discussed. Also, threaded holes 102, 104 are provided in rail 84 to receive bolts 106, 108 for releasable connection with shoe 12.

Wear member assembly 83 thus provides rail surface 110 for supportive engagement with a plurality of undercarriage track rollers such as that graphically illustrated in phantom outline at 112 and lug member first and second ends 90, 92 for driving engagement with a plurality of dual, side-by-side undercarriage sprocket teeth such as those graphically illustrated in phantom outline at 114, 116, respectively.

In operation, parallel rail members 36, 42 are releasably connected to shoe 12 by bolts 46. Lug 38 is keyed at 58, 60 to be releasably connected to rail members 36, 42 at corresponding keyways 40, 44. Alternatively, single rail 84 is releasably connected to shoe 12 by bolts 106, 108. Lug 87 is keyed at 88 to be releasably connected to corresponding keyway 86 of rail 84 and is also provided with threaded holes 94, 96 to be releasably connected to shoe 12 by bolts 98, 100.

The foregoing has described a track shoe wear assembly for endless track-type vehicles including at least one support member being of a construction sufficient for releasable connection to a track shoe and a separate drive member releasably connected to the support member.

The embodiments of the invention in which an exclusive property or privilege is claimed are defined as follows:

1. A track shoe wear assembly for endless track-type vehicles comprising:
   a track shoe;
   hinge members mounted on the track shoe in spaced apart relationship;
   at least one keyed rail support member releasably connected to the shoe between the hinge members and having a rail surface extending longitudinally thereon; and
   a separate keyed lug drive member releasably connected to the keyed rail support member.

2. The track shoe assembly of claim 1, comprising:
   a first rail support member having a first keyway formed therein;
   a second rail support member in substantially parallel spaced relationship with respect to the first member and having a second keyway formed therein in coaxial alignment with the first keyway; and
   the lug drive member has a first key formed on a first end thereof engaged with the first keyway and a second key formed on a second end thereof engaged with the second keyway.

3. The track shoe assembly of claim 2, comprising:
   the lug drive member being of a construction sufficient for releasable connection with the rail support member in a plurality of rotatable positions.

4. The track shoe assembly of claim 2, and further including:
   a sleeve rotatably mounted on the lug drive member between the first and second rail support members.

5. The track shoe assembly of claim 1, comprising:
   a single rail support member having a keyway formed therethrough; and
   the lug drive member being of a construction sufficient for mounting in the rail support member keyway and having a first end extending from one side of the support member and a second end substantially equally extending from an opposite side of the support member.

6. The track shoe assembly of claim 5, comprising:
   the lug drive member being of a construction sufficient for releasable connection with the rail support member in a plurality of rotatable positions.

7. An endless track for track-type vehicles, comprising:
   a plurality of elongated, transversely disposed track shoes, each shoe having an inner surface and an opposite outer ground engaging surface;
   hinge means mounted on each shoe in spaced apart relationship for articulately coupling said shoes together in side-by-side relationship;
   at least one keyed rail support member releasably connected to the shoe between the hinge means and having a rail surface extending longitudinally thereon; and
   a separate keyed lug drive member releasably connected to the keyed support member.

8. The endless track-type vehicle of claim 7, comprising:
   a first rail support member releasably connected to the shoe and having a first keyway formed therein;
   a second rail support member releasably connected to the shoe in substantially parallel spaced relationship with respect to the first member and having a second keyway formed therein in coaxial alignment with the first keyway; and
   the lug drive member has a first key formed on a first end thereof engaged with the first keyway and a second key formed on a second end thereof engaged with the second keyway.

9. The endless track-type vehicle of claim 7, comprising:
   a single rail support member releasably connected to the shoe and having a keyway formed therethrough; and
   the lug drive member releasably connected to the shoe and being of a construction sufficient for mounting in the rail support member keyway and having a first end extending from one side of the support member and a second end substantially equally extending from an opposite side of the support member.

* * * * *